United States Patent Office 3,267,089
Patented August 16, 1966

3,267,089
DISAZO ORANGE DYE
James F. Feeman, Wyomissing, Pa., assignor to Crompton & Knowles Corporation, Worcester, Mass., a corporation of Massachusetts
No Drawing. Filed Dec. 4, 1963, Ser. No. 328,123
6 Claims. (Cl. 260—191)

This invention relates to a new group of organic compounds that are useful as dyes. The new compounds have the following structure:

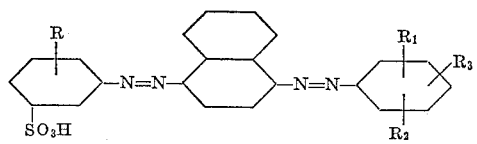

wherein R represents —H or —Cl ortho or para to the azo linkage, $R_1$ and $R_2$ represent —$CH_3$ or —H and $R_3$ represents a benzene sulfonic ester radical $o$ or $p$ to the azo linkage selected from the group

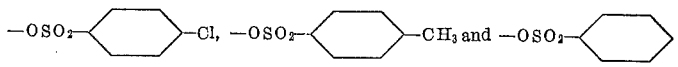

It will be understood that the compounds of this invention not only include the free acids but also the water soluble salts thereof.

The new compounds are obtained by coupling metanilic or chlorometanilic acids to α-naphthylamine, rediazotizing the reaction product and coupling the resulting diazonium salt to phenol, cresol or xylenol and then treating the reaction product with p-toluene sulfonyl chloride, benzene sulfonyl chloride, or p-chlorobenzene sulfonyl chloride and recovering the dye from the reaction mass.

The compounds prepared in accordance with the invention have unique and highly valuable properties when used as dyes. They will dye polyurethane fibers and natural and synthetic polyamide fibers such as nylons, silk and wool in lightfast orange shades having a very high degree of washfastness even without after-treatments with fixatives. The compounds of this invention are especially useful as providing the orange component in blend colors and are particularly useful in compounding black shades for polyamide fibers. On such type of blend is disclosed in my co-pending application Serial No. 328,051 filed concurrently herewith. The dyeing can be effected from neutral solution and with a good degree of dye exhaustion. Because of their neutral dyeing capability, the compounds of this invention can be used in mixed baths with direct dyes. Mixed fabrics, formed from cellulosic fiber and polyamide or polyurethane can be dyed in a single bath.

The following examples will serve to illustrate how the compounds of this invention can be prepared and used. In these examples, unless otherwise indicated, parts are by weight; temperatures are given by degrees centigrade and percentages are percentages by weight.

Example 1

Metanilic acid (17.3 parts) was dissolved in 150 parts of water by addition of 6 parts of sodium carbonate and the resultant solution was iced to 0°. Addition of 25 parts of concentrated hydrochloric acid and 7 parts of sodium nitrite as 30% solution gave the diazonium salt. A solution of 14.3 parts of alpha-naphthylamine in 300 parts of water containing 15 parts of concentrated hydrochloric acid was added, together with sufficient ice to maintain the temperature of the coupling at 5–10°. Sodium hydroxide solution (50%) was then added slowly with good stirring to raise the pH of the coupling to 4.5. Sodium chloride sufficient to equal 25% by weight of the coupling volume was added and, after stirring 30 minutes, more 50% sodium hydroxide was added gradually to raise the coupling pH to 10.5. Sodium nitrite (7.7 parts) as 30% solution was added, followed by 50 parts of concentrated hydrochloric acid at 5–10°. The slurry was allowed to stir 4 hours at this temperature to complete diazotization. The precipitate of diazonium salt was then filtered. The filter cake was reslurried in 30 parts of ice and 500 parts of cold water, and excess nitrous acid was removed by the addition of sulfamic acid. Phenol (11.1 parts of 85%) was added to the slurry, and then a solution of 20 parts of sodium carbonate in 100 parts of water was added, together with sufficient ice to maintain the temperature at 5–10°. After stirring overnight, 4 parts of sodium hydroxide and 5 parts of sodium carbonate were added to the coupling and the temperature was raised to 80°. Para-toluene sulfonyl chloride (22 parts) was added and the temperature was maintained at 80° for one hour. The mixture was salted with 15% sodium chloride (wt. based on volume of slurry), and allowed to stir and cool to 50°. The crystalline product was filtered. After drying and grinding, the resultant solid was an orange water-soluble powder having the structure:

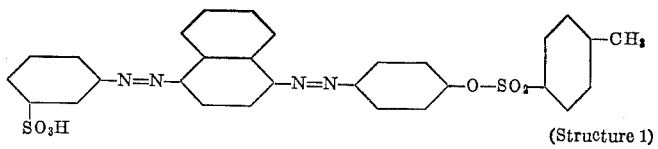

(Structure 1)

and which was found to be useful for dyeing synthetic and natural polyamide fibers from neutral or weakly acid dyebaths in orange shades which are fast to light and washing.

Example 2

In Example 1, while otherwise proceeding as described, the phenol was replaced with 10.8 parts of ortho-cresol, affording a similar product to that of Example 1, having similar properties and having the structure:

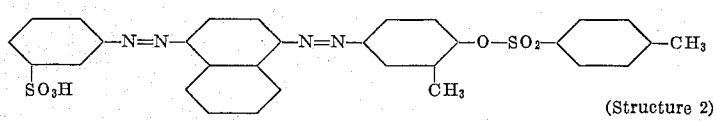

(Structure 2)

*Example 3*

In Example 1, while otherwise proceeding as described, the phenol was replaced with 10.8 parts of meta-cresol, resulting in an orange dye having similar properties to the dye of Example 1, and having the structure:

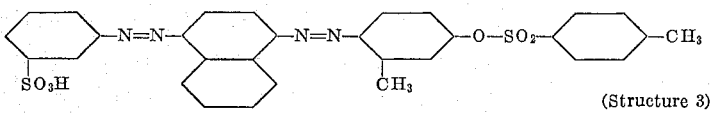

(Structure 3)

*Example 4*

In Example 1, while otherwise proceeding as described, the phenol was replaced with 10.8 parts of para-cresol, resulting in an orange dye having similar properties to the dye of Example 1, and having the structure:

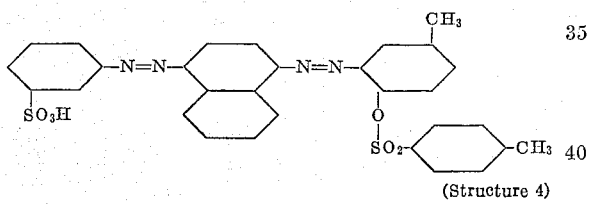

(Structure 4)

*Example 5*

In Example 1, while otherwise proceeding as described, the phenol was replaced with 12.2 parts of 3,5-dimethyl-phenol, resulting in an orange dye having similar properties to that of Example 1, and having the structure:

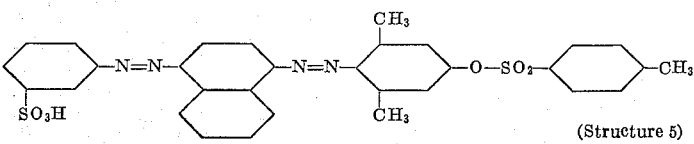

(Structure 5)

*Example 6*

In Example 1, while otherwise proceeding as described, the para-toluene sulfonyl chloride was replaced with 20 parts of benzene sulfonyl chloride, resulting in a dye having similar properties to the dye prepared in Example 1, but having the structure:

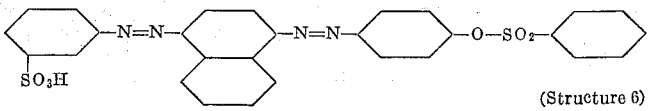

(Structure 6)

*Example 7*

In Example 1, while otherwise proceeding as described, the para toluenesulfony chloride was replaced with 24 parts of para-chloro-benzene sulfonyl chloride, resulting in an orange dye having similar properties to that of Example 1, and having the structure:

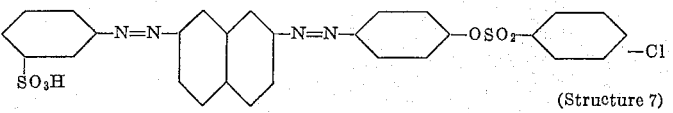

(Structure 7)

*Example 8*

3-amino-4-chlorobenzene sulfonic acid (20.8 parts) was dissolved in 100 parts of water by addition of 6 parts of sodium carbonate, iced to 0°, and diazotized by addition of 25 parts of concentrated hydrochloric acid and 7 parts of sodium nitrite as 30% solution. A solution of 14.3 parts of alpha-naphthylamine dissolved in 300 parts of water and 15 parts of concentrated hydrochloric acid at 70° was added together with sufficient ice to maintain the temperature of the coupling at 5–10°. Sodium hydroxide solution (50%) was added gradually with good stirring to raise the pH of the coupling to 10 in about 30 minutes. Addition of 8 parts of sodium nitrite as 30% solution, 50 parts of concentrated hydrochloric acid, and ice to 5° and stirring for four hours resulted in rediazotization of the coupling. The solid diazonium salt was filtered, repasted in water and ice, treated with 11 parts of 85% phenol and then with 20 parts of sodium carbonate at 0°. The mixture was stirred until coupling was complete. It was then treated with 4 parts of sodium hydroxide and 5 parts of sodium carbonate, heated to 80° and at this temperature treated with 22 parts of para-toluene sulfonyl chloride. After one hour stirring at this temperature, the mixture was salted 10%, cooled to 50° and filtered. After drying and grinding the product was an orange powder which dyed natural and synthetic polyamide fibers from neutral and weakly acid baths in orange shades which are fast to light and washing. The product was water soluble and had the structure:

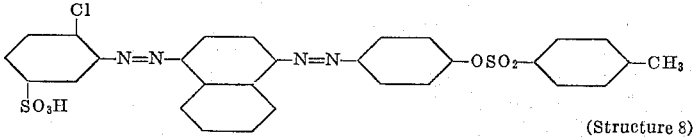

(Structure 8)

Example 9

A fabric consisting of 100 parts of nylon tricot was entered into a dyebath at pH 7.5 prepared by dissolving 1 part of the dye of Example 1 in 2000 parts of water, and the fabric was moved in the bath at 100° for one hour. At the end of this time nearly all of the orange color had left the bath and dyed the nylon a uniform orange shade. The dyeing had good properties with respect to washing and light fastness.

I claim:

1. A compound having the following structure:

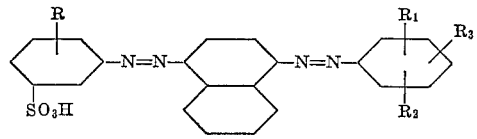

wherein R represents a radical selected from the group consisting of —H, chloro ortho to the azo linkage, and chloro para to the azo linkage; $R_1$ and $R_2$ represent a radical selected from the group consisting of —H and —$CH_3$; and $R_3$ represents a benzene sulfonic ester radical selected from the group consisting of $$-O-SO_2-\bigcirc-Cl, -O-SO_2-\bigcirc-CH_3, \text{ and}$$

$$-O-SO_2-\bigcirc$$

2. The compound having the structure

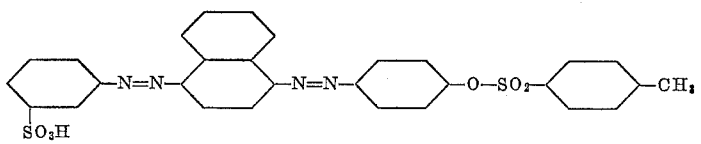

3. The compound having the structure

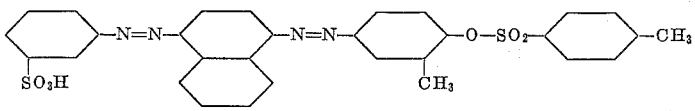

4. The compound having the structure

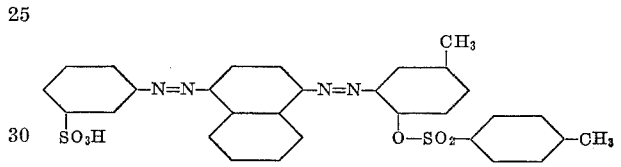

5. The compound having the structure

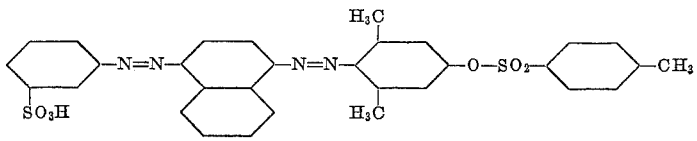

6. The compound having the structure

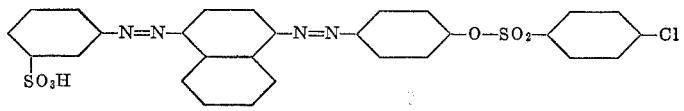

References Cited by the Examiner

UNITED STATES PATENTS

| | | | |
|---|---|---|---|
| 2,124,690 | 7/1938 | Daudt et al. | 260—191 X |
| 2,180,246 | 11/1939 | Kresber | 260—191 |
| 2,222,749 | 11/1940 | Kresber | 260—197 |

CHARLES B. PARKER, *Primary Examiner.*

FLOYD D. HIGEL, *Assistant Examiner.*